(12) United States Patent
Sasaki et al.

(10) Patent No.: US 11,670,775 B2
(45) Date of Patent: *Jun. 6, 2023

(54) POSITIVE ELECTRODE MATERIAL AND BATTERY

(71) Applicant: Panasonic Intellectual Property Management Co., Ltd., Osaka (JP)

(72) Inventors: Izuru Sasaki, Kyoto (JP); Akihiro Sakai, Nara (JP); Yuta Sugimoto, Hyogo (JP); Akinobu Miyazaki, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 229 days.

This patent is subject to a terminal disclaimer.

(21) Appl. No.: 16/914,333

(22) Filed: Jun. 27, 2020

(65) Prior Publication Data

US 2020/0328467 A1 Oct. 15, 2020

Related U.S. Application Data

(63) Continuation of application No. PCT/JP2018/041899, filed on Nov. 13, 2018.

(30) Foreign Application Priority Data

Jan. 5, 2018 (JP) .............................. JP2018-000430

(51) Int. Cl.
*H01M 4/62* (2006.01)
*H01M 4/36* (2006.01)
(Continued)

(52) U.S. Cl.
CPC ............ *H01M 4/62* (2013.01); *H01M 4/131* (2013.01); *H01M 4/366* (2013.01); *H01M 4/525* (2013.01);
(Continued)

(58) Field of Classification Search
None
See application file for complete search history.

(56) References Cited

U.S. PATENT DOCUMENTS

2010/0273062 A1* 10/2010 Tsuchida ............... H01M 4/131
429/304
2011/0027661 A1* 2/2011 Okazaki ............... H01M 4/525
429/322
(Continued)

FOREIGN PATENT DOCUMENTS

CN 101953000 A 1/2011
CN 105254184 1/2016
(Continued)

OTHER PUBLICATIONS

Alysia Zevgolis et al., "Alloying effects on superionic conductivity in lithium indium halides for all-solid-state batteries", APL Materials, vol. 6, Issue 4, Feb. 26, 2018, 047903(1-8).*
(Continued)

*Primary Examiner* — Laura Weiner
(74) *Attorney, Agent, or Firm* — McDermott Will & Emery LLP

(57) ABSTRACT

Provided is a positive electrode material including a positive electrode active material, a first solid electrolyte material, and a coating material. The coating material is located on the surface of the positive electrode active material. The first solid electrolyte material includes lithium, at least one kind selected from the group consisting of metalloid elements and metal elements other than lithium, and at least one kind selected from the group consisting of chlorine, bromine, and iodine. The first solid electrolyte material does not include sulfur.

7 Claims, 3 Drawing Sheets

(51) Int. Cl.
  *H01M 10/0525* (2010.01)
  *H01M 10/0562* (2010.01)
  *H01M 4/525* (2010.01)
  *H01M 4/131* (2010.01)
  *H01M 4/02* (2006.01)

(52) U.S. Cl.
  CPC ... *H01M 10/0525* (2013.01); *H01M 10/0562* (2013.01); *H01M 2004/028* (2013.01); *H01M 2300/008* (2013.01); *H01M 2300/0071* (2013.01); *H01M 2300/0094* (2013.01)

(56) References Cited

U.S. PATENT DOCUMENTS

| | | | |
|---|---|---|---|
| 2012/0052396 A1* | 3/2012 | Tsuchida | H01M 4/131 429/304 |
| 2013/0260258 A1* | 10/2013 | Tsuchida | H01M 4/131 429/304 |
| 2016/0028107 A1* | 1/2016 | Kubo | H01M 10/0562 252/62.2 |
| 2016/0211519 A1 | 7/2016 | Uchiyama et al. | |
| 2019/0088995 A1 | 3/2019 | Asano et al. | |

FOREIGN PATENT DOCUMENTS

| | | | |
|---|---|---|---|
| JP | 2006-244734 | * | 9/2006 |
| JP | WO 2012-077225 | * | 6/2012 |
| JP | 2014-056818 | | 3/2014 |
| WO | 2012/077225 | | 6/2012 |
| WO | 2018/025582 | | 2/2018 |

OTHER PUBLICATIONS

International Search Report of PCT application No. PCT/JP2018/041899 dated Feb. 19, 2019.
Andreas Bohnsack et al., "The bromides Li3MBr6 (M=Sm-Lu,Y): Synthesis, Crystal Structure, and Ionic Mobility", Journal of Inorganic and General Chemistry, Sep. 1997, vol. 623/Issue 9, pp. 1352-1356.
Andreas Bohnsack et al., "Ternary Chlorides of the Rare-Earth Elements with Lithium, Li3MCl6 (M=Tb-Lu, Y, Sc): Synthesis, Crystal Structures, and Ionic Motion", Journal of Inorganic and General Chemistry, Jul. 1997, vol. 623/Issue 7, pp. 1067-1073.
The Extended European Search Report dated Feb. 11, 2021 for the related European Patent Application No. 18898874.5.
English Translation of Chinese Search Report dated Dec. 2, 2022 for the related Chinese Patent Application No. 201880081858.1.

* cited by examiner

C.E. means comparative example
I. E. means inventive example

POSITIVE ELECTRODE MATERIAL AND BATTERY

BACKGROUND

1. Technical Field

The present disclosure relates to a positive electrode material for a battery, and a battery.

2. Description of the Related Art

Patent Literature 1 discloses an all-solid battery using, as a solid electrolyte, a halide including indium.

CITATION LIST

Patent Literature

Patent Literature 1: Japanese Patent Application Publication No. 2006-244734

SUMMARY

In the prior art, further improvement of charge-discharge efficiency of a battery is desired.

The positive electrode material in one aspect of the present disclosure comprises:
a positive electrode active material;
a first solid electrolyte material; and
a coating material,
wherein
the coating material is located on a surface of the positive electrode active material;
the first solid electrolyte material includes:
lithium;
at least one kind selected from the group consisting of metalloid elements and metal elements other than lithium; and
at least one kind selected from the group consisting of chlorine, bromine, and iodine; and
the first solid electrolyte material does not include sulfur.

According to the present disclosure, the charge-discharge efficiency of the battery can be improved.

DETAILED DESCRIPTION OF THE EMBODIMENTS

Figure 1:
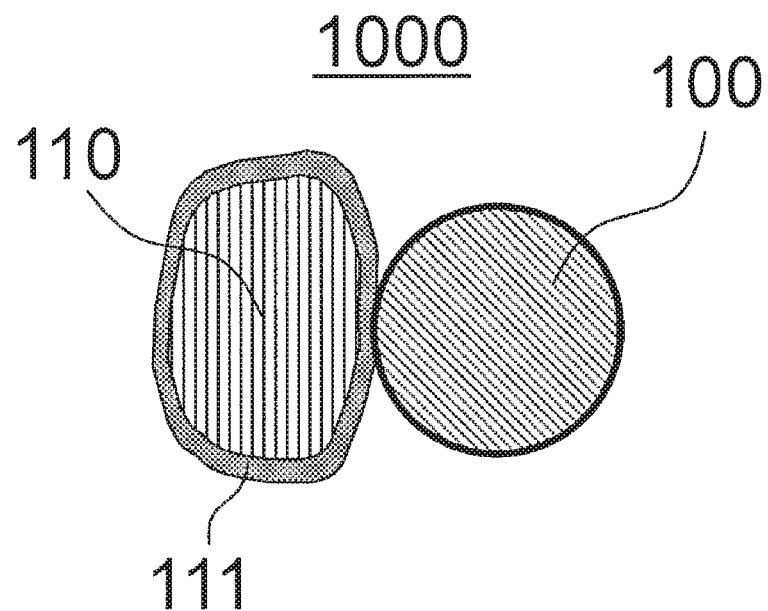
FIG. 1 is a cross-sectional view showing a schematic configuration of a positive electrode material 1000 in a first embodiment.

Hereinafter, embodiments of the present disclosure will be described with reference to the drawings.

First Embodiment

The positive electrode material in the first embodiment includes a positive electrode active material, a first solid electrolyte material, and a coating material.

The first solid electrolyte material is a material represented by the following composition formula (1):

$$Li_\alpha M_\beta X_\gamma \qquad \text{Formula (1)}$$

where, $\alpha$, $\beta$ and $\gamma$ are values larger than 0.

M includes at least one of metalloid elements and metal elements other than Li.

X is one or more kinds of elements selected from the group consisting of Cl, Br and I.

The coating material is located on a surface of the positive electrode active material.

According to the above configuration, the charge-discharge efficiency of the battery can be improved.

Patent Literature 1 discloses that, in the all-solid secondary battery including a solid electrolyte consisting of a compound including indium, it is preferable that the positive electrode active material has an electric potential of not more than 3.9 V with respect to Li on average, and that thereby a film consisting of a decomposition product due to oxidative decomposition is satisfactorily formed to provide a good charge-discharge characteristic. In addition, a general layered transition metal oxide positive electrode such as $LiCoO_2$ or $LiNi_{0.8}Co_{0.15}Al_{0.05}O_2$ is disclosed as such a positive electrode active material having an electric potential with regard to Li of not more than 3.9 V on average. In addition, detailed mechanism of the oxidative decomposition has not been clarified.

On the other hand, as a result of intensive investigations by the present inventors, in a battery using a halide solid electrolyte (namely, a first solid electrolyte material) as a positive electrode material, even if a positive electrode active material having an electric potential with regard to Li of not more than 3.9 V on average is used, there is a problem that the halide solid electrolyte is oxidized and decomposed during charge, and the charge-discharge efficiency of the battery is decreased due to the oxidative decomposition. The present inventors found that the reason therefor is oxidation reaction of a halogen element included in the halide solid electrolyte.

Specifically, in addition to usual charge reaction in which lithium and electrons are extracted from the positive electrode active material in the positive electrode material, a side reaction in which electrons are also extracted from the halide solid electrolyte in contact with the positive electrode active material occurs, and electric charges are consumed for the side reaction. As a result, the charge-discharge efficiency would be lowered.

In addition, it is conceivable that an oxide layer having poor lithium-ion conductivity is formed between the positive electrode active material and the halide solid electrolyte together with the oxidation reaction of the halide solid electrolyte, and the oxide layer functions as a large interface resistance in the electrode reaction of the positive electrode. In order to solve this problem, it is necessary to suppress transfer of electrons to the halide solid electrolyte and to suppress the formation of the oxide layer.

In the configuration of the present disclosure, a coating material is interposed between the positive electrode active material and the halide solid electrolyte. As a result, the coating material suppresses the electron transfer to the halide solid electrolyte. Therefore, the side reaction of the halide solid electrolyte does not occur, and the charge-discharge efficiency can be improved. In addition, since a side reaction does not occur, the formation of the oxide layer is suppressed, and the interface resistance of the electrode reaction can be lowered.

The term "metalloid elements" refers to B, Si, Ge, As, Sb, and Te.

The term "metal elements" refers to all elements included in Groups 1 to 12 of the periodic table except for hydrogen, and all the elements included in Groups 13 to 16 of the periodic table except for the above-mentioned metalloid elements, C, N, P, O, S, and Se. In other words, the metal element becomes a cation, if the metal element forms an inorganic compound with a halogen compound.

In the composition formula (1), M may include Y (=yttrium).

In other words, the first solid electrolyte material may include Y as a metal element.

According to the above configuration, the ion conductivity of the first solid electrolyte material can be further improved. Thereby, the charge/discharge efficiency of the battery can be further improved.

The first solid electrolyte material including Y may be, for example, a compound represented by a composition formula $Li_aMe_bY_cX_6$ (a+mb+3c=6 and c>0 are satisfied) (Me: at least one of metalloid elements and metal elements other than Li and Y) (m: valence of Me).

As Me, any of Mg, Ca, Sr, Ba, Zn, Sc, Al, Ga, Bi, Zr, Hf, Ti, Sn, Ta, and Nb, or a mixture thereof may be used.

According to the above configuration, the ion conductivity of the first solid electrolyte material can be further improved.

In the composition formula (1), $2 \leq \gamma/\alpha \leq 2.22$ may be satisfied. The formulas $2.7 \leq \alpha \leq 3$, $1 \leq \beta \leq 1.1$, and $\gamma=6$ may be satisfied.

According to the above configuration, the ion conductivity of the first solid electrolyte material can be further improved. Thereby, the charge/discharge efficiency of the battery can be further improved.

In the composition formula (1), X may include I (=iodine).

According to the above configuration, the ion conductivity of the first solid electrolyte material can be further improved. Thereby, the charge/discharge efficiency of the battery can be further improved.

The first solid electrolyte material may be a material represented by the following composition formula (A1):

$$Li_{6-3d}Y_dX_6 \qquad \text{Formula (A1)}$$

where, in the composition formula (A1), X is two or more kinds of elements selected from the group consisting of Cl, Br, and I.

In addition, in the composition formula (A1), 0<d<2 is satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A2):

$$Li_3YX_6 \qquad \text{Formula (A2)}$$

where, in the composition formula (A2), X is two or more kinds of elements selected from the group consisting of Cl, Br, and I.

According to the above configuration, the ion conductivity of the first solid electrolyte material can be further improved. Thereby, the charge/discharge efficiency of the battery can be further improved.

The first solid electrolyte material may be a material represented by the following composition formula (A3):

$$Li_{3-3\delta}Y_{1+\delta}Cl_6 \qquad \text{Formula (A3)}$$

where, in the composition formula (A3), 0<δ≤0.15 is satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A4):

$$Li_{3-3\delta}Y_{1+\delta}Br_6 \qquad \text{Formula (A4)}$$

where, in the composition formula (A4), 0<δ≤0.25 is satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A5):

$$Li_{3-3\delta+a}Y_{1+\delta-a}Me_aCl_{6-x-y}Br_xI_y \qquad \text{Formula (A5)}$$

where, in the composition formula (A5), Me is one or more kinds of elements selected from the group consisting of Mg, Ca, Sr, Ba, and Zn.

In addition, in the composition formula (A5),
−1<δ<2;
0<a<3;
0<(3−3δ+a);
0<(1+δ−a);
0≤x≤6;
0≤y≤6; and
(x+y)≤6 are satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A6):

$$Li_{3-3\delta}Y_{1+\delta-a}Me_aCl_{6-x-y}Br_xI_y \qquad \text{Formula (A6)}$$

where, in the composition formula (A6), Me is one or more kinds of elements selected from the group consisting of Al, Sc, Ga, and Bi.

In addition, in the composition formula (A6),
−1<δ<1;
0<a<2;
0<(1+δ−a);
0≤x≤6;
0≤y≤6; and
(x+y)≤6 are satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A7):

$$Li_{3-3\delta-a}Y_{1+\delta-a}Me_aCl_{6-x-y}Br_xI_y \qquad \text{Formula (A7)}$$

where, in the composition formula (A7), Me is one or more kinds of elements selected from the group consisting of Zr, Hf, and Ti.

In addition, in the composition formula (A7),
−1<δ<1;
0<a<1.5;
0<(3−3δ−a);
0<(1+δ−a);
0≤x≤6;
0≤y≤6; and
(x+y)≤6 are satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A8):

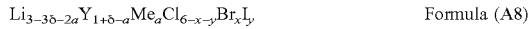

Formula (A8)

where, in the composition formula (A8), Me is one or more kinds of elements selected from the group consisting of Ta and Nb.

In addition, in the composition formula (A8),
−1<δ<1;
0<a<1.2;
0<(3−3δ−2a);
0<(1+δ−a);
0≤x≤6;
0≤y≤6; and
(x+y)≤6 are satisfied.

According to the above configuration, the ion conductivity of the first solid electrolyte material can be further improved. Thereby, the charge/discharge efficiency of the battery can be further improved.

As the first solid electrolyte material, for example, $Li_3YX_6$, $Li_2MgX_4$, $Li_2FeX_4$, Li(Al, Ga, In)$X_4$, or $Li_3$(Al, Ga, In)$X_6$ may be used.

The positive electrode active material includes a material having a property of storing and releasing metal ions (for example, lithium ions). As a positive electrode active material, for example, a lithium-containing transition metal oxide (e.g., Li(NiCoAl)$O_2$, Li(NiCoMn)$O_2$, or LiCoO$_2$), a transition metal fluoride, a polyanionic material or fluorinated polyanionic material, a transition metal sulfide, a transition metal oxysulfide, or a transition metal oxynitride may be used. In particular, if a lithium-containing transition metal oxide is used as the positive electrode active material, cost reduction can be performed and an average discharge voltage can be increased.

In the first embodiment, the positive electrode active material may be lithium nickel-cobalt-manganese oxide. For example, the positive electrode active material may be Li(NiCoMn)$O_2$.

According to the above configuration, the energy density and the charge/discharge efficiency of the battery can be further enhanced.

As the coating material, a material having low electron conductivity may be used. As the coating material, an oxide material or an oxide solid electrolyte may be used.

As the oxide material, $SiO_2$, $Al_2O_3$, $TiO_2$, $B_2O_3$, $Nb_2O_5$, $WO_3$ or $ZrO_2$ may be used, for example. Examples of the oxide solid electrolytes include a Li—Nb—O compound such as LiNbO$_3$, a Li—B—O compound such as $Li_3BO_2$ or $Li_3BO_3$, a Li—Al—O compound such as LiAlO$_2$, a Li—Si—O compound such as $Li_4SiO_4$, $Li_2SO_4$, a Li—Ti—O compound such as $Li_4Ti_5O_{12}$, a Li—Zr—O compound such as $Li_2ZrO_3$, a Li—Mo—O compound such as $Li_2MoO_3$, a Li—V—O compound such as LiV$_2$O$_5$, and a Li—W—O compound such as $Li_2WO_4$.

In the first embodiment, the coating material may be an oxide solid electrolyte.

The oxide solid electrolyte has high ion conductivity and high potential stability. For this reason, the charge/discharge efficiency can be further improved by using the oxide solid electrolyte.

In the first embodiment, the oxide solid electrolyte may be lithium niobate. For example, the oxide solid electrolyte may be LiNbO$_3$.

Lithium niobate has higher ion conductivity and higher potential stability. Therefore, the charge-discharge efficiency can be further improved by using lithium niobate.

FIG. 1 is a cross-sectional view showing a schematic configuration of a positive electrode material 1000 in the first embodiment.

The positive electrode material 1000 in the first embodiment includes first solid electrolyte particles 100, positive electrode active material particles 110, and a coating layer 111.

The positive electrode active material particles 110 and the first solid electrolyte particles 100 are separated by the coating layer 111 and are not in direct contact with each other.

The coating layer 111 is a layer including a coating material. In other words, the coating layer 111 is provided on the surfaces of the positive electrode active material particles 110.

The thickness of the coating layer 111 may be not less than 1 nm and not more than 100 nm.

Since the thickness of the coating layer 111 is not less than 1 nm, the direct contact between the positive electrode active material particles 110 and the first solid electrolyte particles 100 can be suppressed, and a side reaction of the first solid electrolyte material can be suppressed. As a result, the charge-discharge efficiency can be improved.

In addition, since the thickness of the coating layer 111 is not more than 100 nm, the thickness of the coating layer 111 is not too thick. Therefore, internal resistance of the battery can be sufficiently decreased. As a result, the energy density of the battery can be increased.

In addition, the coating layer 111 may uniformly coat each of the particles of the positive electrode active material particles 110. The direct contact between the positive electrode active material particles 110 and the first solid electrolyte particles 100 can be suppressed, and the side reaction of the first solid electrolyte material can be suppressed. As a result, the charge-discharge efficiency can be improved.

Alternatively, the coating layer 111 may coat a part of each of the particles of the positive electrode active material particles 110. The plurality of the positive electrode active material particles 110 are in direct contact with each other through the part in which the coating layer 111 is not formed, and electron conductivity between the particles of the positive electrode active material particles 110 is improved. As a result, the operation at high output of the battery is allowed.

In addition, a shape of each of the first solid electrolyte particles 100 in the first embodiment is not particularly limited, and may be, for example, an acicular shape, a spherical shape, or an elliptical shape. For example, the shape of the first solid electrolyte material may be particles.

For example, if the shape of each of the first solid electrolyte particles 100 in the first embodiment is particulate (e.g., spherical), the median diameter thereof may be not more than 100 μm. If the median diameter is more than 100 μm, a good dispersion state of the positive electrode active material particles 110 and the first solid electrolyte particles 100 may fail to be formed in the positive electrode material. Therefore, the charge-discharge characteristic is lowered. In the first embodiment, the median diameter may be not more than 10 μm.

According to the above configuration, in the positive electrode material, a good dispersion state of the positive electrode active material particles 110 and the first solid electrolyte particles 100 can be formed.

In the first embodiment, the first solid electrolyte particles 100 may be smaller than the median diameter of the positive electrode active material particles 110.

According to the above configuration, a better dispersion state of the first solid electrolyte particles 100 and the positive electrode active material particles 110 can be formed in the electrode.

The median diameter of the positive electrode active material particles 110 may be not less than 0.1 μm and not more than 100 μm.

If the median diameter of the positive electrode active material particles 110 is less than 0.1 μm, there is a possibility that a good dispersion state of the positive electrode active material particles 110 and the first solid electrolyte particles 100 may fail to be formed in the positive electrode material. As a result, the charge-discharge characteristic of the battery is lowered. In addition, if the median diameter of the positive electrode active material particles 110 is more than 100 μm, lithium diffusion in the positive electrode active material particles 110 is made slow. As a result, the operation at high output of the battery may be difficult.

The median diameter of the positive electrode active material particles 110 may be larger than the median diameter of the first solid electrolyte particles 100. Thereby, a good dispersion state of the positive electrode active material particles 110 and the first solid electrolyte particles 100 can be formed.

In addition, in the positive electrode material 1000 in the first embodiment, the first solid electrolyte particles 100 and the coating layer 111 may be in contact with each other, as shown in FIG. 1.

In addition, the positive electrode material 1000 in the first embodiment may include a plurality of the first solid electrolyte particles 100 and a plurality of the positive electrode active material particles 110.

In addition, in the positive electrode material 1000 in the first embodiment, the content of the first solid electrolyte particles 100 and the content of the positive electrode active material particles 110 may be the same as or different from each other.

<Manufacturing Method of First Solid Electrolyte Material>

The first solid electrolyte material in the first embodiment may be manufactured, for example, by the following method.

Binary halide raw material powders are prepared so as to provide a blending ratio of a target composition. For example, if $Li_3YCl_6$ is produced, LiCl and $YCl_3$ are prepared at a molar ratio of 3:1.

At this time, "M", "Me", and "X" in the above-described composition formula can be determined by selecting the kinds of the raw material powders. In addition, the above-mentioned values "α", "β", "γ", "d", "δ", "a", "x" and "y" can be adjusted by adjusting the raw materials, the blending ratio and the synthesis process.

After the raw material powders are mixed well, the raw material powders are mixed and ground to react by a mechanochemical milling method. Alternatively, after the raw material powders are mixed well, the raw material powders may be sintered in a vacuum.

Thereby, a solid electrolyte material including a crystal phase as described above is provided.

The configuration of the crystal phase (the crystal structure) in the solid electrolyte material can be determined by adjusting the reaction method and reaction conditions of the raw material powders.

Second Embodiment

The second embodiment will be described below. The description which has been set forth in the first embodiment is omitted as appropriate.

Figure 2:
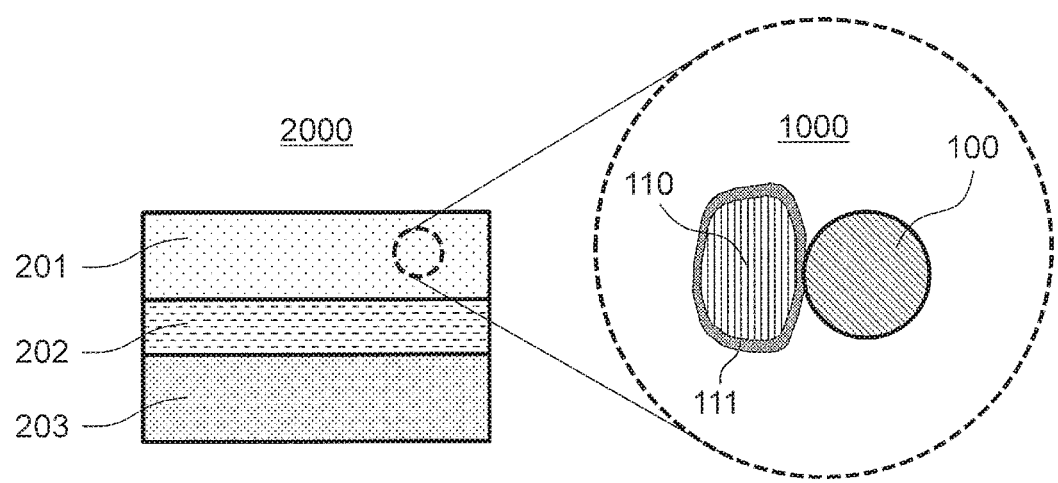
FIG. 2 is a cross-sectional view showing a schematic configuration of a battery 2000 in a second embodiment.

FIG. 2 is a cross-sectional view showing a schematic configuration of a battery 2000 in the second embodiment.

The battery 2000 in the second embodiment comprises a positive electrode 201, an electrolyte layer 202, and a negative electrode 203.

The positive electrode 201 includes the positive electrode material (for example, the positive electrode material 1000) according to the first embodiment.

The electrolyte layer 202 is disposed between the positive electrode 201 and the negative electrode 203.

According to the above configuration, the charge-discharge efficiency of the battery can be improved.

With regard to a volume ratio "v:100-v" of the positive electrode active material particles 110 and the first solid electrolyte particles 100 included in the positive electrode 201, $30 \leq v \leq 95$ may be satisfied. If $v<30$, it may be difficult to secure an energy density of the battery sufficiently. In addition, if $v>95$, the operation at high output may be difficult.

The thickness of the positive electrode 201 may be not less than 10 μm and not more than 500 μm. If the thickness of the positive electrode 201 is less than 10 μm, it may be difficult to secure an energy density of the battery sufficiently. If the thickness of the positive electrode 201 is more than 500 μm, the operation at high output may be difficult.

The electrolyte layer 202 is a layer including an electrolyte material. The electrolyte material is, for example, a solid electrolyte material (namely, a second solid electrolyte material). In other words, the electrolyte layer 202 may be a solid electrolyte layer.

Examples of the second solid electrolyte material included in the electrolyte layer 202 include the first solid electrolyte material described in the first embodiment. In other words, the electrolyte layer 202 may include the first solid electrolyte material described in the first embodiment.

According to the above configuration, the charge-discharge efficiency of the battery can be further improved.

Alternatively, the second solid electrolyte material included in the electrolyte layer 202 may be a halide solid electrolyte material different from the first solid electrolyte material in the first embodiment. In other words, the electrolyte layer 202 may include a halide solid electrolyte material different from the first solid electrolyte material in the first embodiment.

According to the above configuration, output density and the charge/discharge efficiency of the battery can be improved.

The halide solid electrolyte material included in the electrolyte layer 202 may include Y as a metal element.

According to the above configuration, the output density and the charge/discharge efficiency of the battery can be further improved.

As the halide solid electrolyte material included in the electrolyte layer 202, the material described in the first solid electrolyte material in the first embodiment can be used.

A sulfide solid electrolyte may be used as the second solid electrolyte material included in the electrolyte layer 202, In other words, the electrolyte layer 202 may include a sulfide solid electrolyte.

According to the above configuration, since a sulfide solid electrolyte excellent in reduction stability is included, a low potential negative electrode material such as graphite or metallic lithium can be used, and the energy density of the battery can be improved.

As the sulfide solid electrolyte, $Li_2S—P_2S_5$, $Li_2S—SiS_2$, $Li_2S—B_2S_3$, $Li_2S—GeS_2$, $Li_{3.25}Ge_{0.25}P_{0.75}S_4$, or $Li_{10}GeP_2S_{12}$ may be used. In addition; LiX (X: F, Cl, Br; I), $Li_2O$, $MO_q$, or $Li_pMO_q$ (M: any of P, Si, Ge, B, Al, Ga, In, Fe, and Zn) (p, q: natural number) may be added thereto.

As the second solid electrolyte material included in the electrolyte layer 202, an oxide solid electrolyte; a solid polymer electrolyte, or a complex hydride solid electrolyte may be used.

As the oxide solid electrolyte, for example, a NASICON solid electrolyte such as $LiTi_2(PO_4)_3$ and its element substitution products, a $(LaLi)TiO_3$ perovskite solid electrolyte, a LISICON solid electrolyte such as $Li_{14}ZnGe_4O_{16}$, $Li_4SiO_4$, $LiGeO_4$ and its element substitution products, a garnet solid electrolyte such as $Li_7La_3Zr_2O_{12}$ and its element substitution products, $Li_3N$ and its H substitution, $Li_3PO_4$ and its N substitution products, glass or glass ceramics to which $Li_2SO_4$ or $Li_2CO_3$ has been added using a Li—B—O compound such as $LiBO_2$ or $Li_3BO_3$ as the base thereof, or glass ceramics may be used.

As the solid polymer electrolyte; for example, a compound of a polymer compound and a lithium salt can be used. The polymer compound may have an ethylene oxide structure. Due to the ethylene oxide structure, a large amount of lithium salt can be included to further increase the ion conductivity, As a lithium salt, $LiPF_5$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ may be used, As a lithium salt, one lithium salt selected therefrom may be used alone. Alternatively, a mixture of two or more lithium salts selected therefrom may be used as the lithium salt.

As the complex hydride solid electrolyte, for example, $LiBH_4—LiI$ or $LiBH_4—P_2S_5$ may be used.

The solid electrolyte layer may include the second solid electrolyte material as a main component. In other words, the solid electrolyte layer may include the second solid electrolyte material, for example, at a weight ratio of not less than 50% (not less than 50% by weight) with respect to the entire solid electrolyte layer.

According to the above configuration, the charge-discharge characteristic of the battery can be further improved.

In addition, the solid electrolyte layer may include the second solid electrolyte material, for example, at a weight ratio of not less than 70% (not less than 70% by weight) with respect to the entire solid electrolyte layer.

According to the above configuration, the charge-discharge characteristic of the battery can be further improved.

The solid electrolyte layer includes the second solid electrolyte material as the main component thereof, and the solid electrolyte layer may further include inevitable impurities. The solid electrolyte layer may include the starting materials used for the synthesis of the second solid electrolyte material. The second electrolyte layer may include by-products or decomposition products generated when the second solid electrolyte material is synthesized.

In addition, the solid electrolyte layer may include the second solid electrolyte material, for example, at a weight ratio of 100% (100% by weight) with respect to the entire solid electrolyte layer, except for the inevitable impurities.

According to the above configuration, the charge-discharge characteristic of the battery can be further improved.

As described above, the solid electrolyte layer may be composed of only the second solid electrolyte material.

The solid electrolyte layer may include two or more kinds of the materials described as the second solid electrolyte material. For example, the solid electrolyte layer may include the halide solid electrolyte material and the sulfide solid electrolyte material.

The thickness of the electrolyte layer 202 may be not less than 1 µm and not more than 300 µm. If the thickness of the electrolyte layer 202 is less than 1 µm, the possibility of short circuit between the positive electrode 201 and the negative electrode 203 is increased. In addition, if the thickness of the electrolyte layer 202 is more than 300 µm, the operation at high output may be difficult.

The negative electrode 203 includes a material having a property of storing and releasing metal ions (e.g., lithium ions). The negative electrode 203 includes, for example, a negative electrode active material.

As the negative electrode active material, a metal material, a carbon material, an oxide, a nitride, a tin compound, or a silicon compound may be used. The metal material may be a single metal. Alternatively, the metal material may be an alloy. Examples of the metal material include a lithium metal and a lithium alloy. Examples of the carbon material include natural graphite, coke, graphitized carbon, carbon fibers, spherical carbon, artificial graphite, and amorphous carbon. From the viewpoint of capacity density, silicon (Si), tin (Sn), a silicon compound, or a tin compound can be suitably used.

The negative electrode 203 may include a solid electrolyte material. According to the above configuration, the lithium-ion conductivity in the negative electrode 203 is increased to allow the operation at high output. As a solid electrolyte material, a material exemplified as the electrolyte layer 202 may be used.

The median diameter of the negative electrode active material particles may be not less than 0.1 µm and not more than 100 µm. If the median diameter of the negative electrode active material particles is less than 0.1 µm, there is a possibility that a good dispersion state of the negative electrode active material particles and the solid electrolyte material fails to be formed in the negative electrode. This lowers the charge-discharge characteristic of the battery. In addition, if the median diameter of the negative electrode active material particles is more than 100 µm, lithium diffusion in the negative electrode active material particles is made slow. As a result, the operation at high output of the battery may be difficult.

The median diameter of the negative electrode active material particles may be larger than the median diameter of the solid electrolyte material. Thereby, a good dispersion state of the negative electrode active material particles and the solid electrolyte material can be formed.

With regard to a volume ratio "v:100-v" of the negative electrode active material particles and the solid electrolyte material included in the negative electrode 203, $30 \leq v \leq 95$ may be satisfied. If v<30, it may be difficult to secure an energy density of the battery sufficiently. In addition, if v>95, the operation at high output may be difficult.

The thickness of the negative electrode 203 may be not less than 10 µm and not more than 500 µm. If the thickness of the negative electrode is less than 10 µm, it may be difficult to secure an energy density of the battery sufficiently. In addition, if the thickness of the negative electrode is more than 500 µm, the operation at high output may be difficult.

At least one of the positive electrode 201, the electrolyte layer 202, and the negative electrode 203 may include a binder for the purpose of improving the adhesion between the particles. The binder is used to improve the binding property of the material forming the electrode. Examples of the binder includes polyvinylidene fluoride, polytetrafluoroethylene, polyethylene, polypropylene, aramid resin, polyamide, polyimide, polyamideimide, polyacrylonitrile, polyacrylic acid, methyl polyacrylate ester, ethyl polyacrylate ester, hexyl polyacrylate ester, polymethacrylic acid, methyl polymethacrylate ester, ethyl polymethacrylate ester, hexyl polymethacrylate ester, polyvinyl acetate, polyvinyl pyrrolidone, polyether, polyether sulfone, hexafluoropolypropylene, styrene butadiene rubber, and carboxymethylcellulose. In addition, as a binder, a copolymer of two or more kinds of materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene can be used. In addition, two or more kinds selected therefrom may be mixed and used as the binder.

At least one of the positive electrode 201 and the negative electrode 203 may include a conductive agent for the purpose of enhancing the electron conductivity. Examples of the conductive agent include graphite such as natural graphite or artificial graphite; carbon black such as acetylene black or ketjen black; a conductive fiber such as a carbon fiber or a metal fiber; carbon fluoride; a metal powder such as aluminum; conductive whiskers such as zinc oxide or potassium titanate; a conductive metal oxide such as titanium oxide; or a conductive polymer compound such as polyaniline, polypyrrole, or polythiophene. Cost reduction can be achieved by using a carbon conductive agent as the conductive agent.

An example of the shape of the battery in the second embodiment may be a coin, a cylinder, a prism, a sheet, a button, a flat type; or a stacking structure.

EXAMPLES

Hereinafter, details of the present disclosure will be described with reference to inventive examples and comparative examples.

Inventive Example 1

[Production of First Solid Electrolyte Material]

In an argon glove box with a dew point of −60° C. or less, raw material powders LiBr, LiCl, LiI, YCl$_3$, and YBr$_3$ were prepared at a molar ratio of LiBr:LiCl:LiI:YCl$_3$:YBr$_3$=1:1:4:1:1. Subsequently, milling processing was performed at 600 rpm for 25 hours using a planetary ball mill (P-7 type, manufactured by Fritsch Co. Ltd.) to provide a powder of the first solid electrolyte material Li$_3$YBr$_2$Cl$_2$I$_2$.

[Production of Positive Electrode Active Material Coating Layer]

In an argon glove box, 5.95 g of ethoxylithium (manufactured by Kojundo chemical laboratory Co., Ltd.) and 36.43 g of pentaethoxy niobium (manufactured by Kojundo chemical laboratory Co., Ltd.) were dissolved in 500 mL of super-dehydrated ethanol (manufactured by FujiFilm Wako Pure Chemical Corporation) to provide a coating solution.

A tumbling fluidized bed granulating-coating machine (manufactured by Powrex Corp., FD-MP-01E) was used to form a coating layer on the positive electrode active material Li(NiCoMn)O$_2$ (hereinafter, referred to as NCM). The amount of charge of the positive electrode active material, the number of rotations of stirring, and the liquid transfer rate were 1 kg, 400 rpm, and 6.59 g/min, respectively.

The treated powder was put in an alumina crucible and taken out under an air atmosphere.

Next, heat treatment was performed at 300° C. for one hour in the air.

The heat-treated powder was ground again in an agate mortar to provide the positive electrode active material of the inventive example 1 in which the coating layer was formed on the surface of each of the particles.

The material of the coating layer was LiNbO$_3$.

[Production of Positive Electrode Material]

In an argon glove box, the first solid electrolyte material of the inventive example 1 and the positive electrode active material of the inventive example 1 (NCM on which the coating layer had been formed) were prepared at a weight ratio of 30:70. By mixing these in an agate mortar, the positive electrode material of the inventive example 1 was produced.

Inventive Example 2

[Production of First Solid Electrolyte Material]

In an argon glove box with a dew point of −60° C. or less, raw material powders LiCl, YCl$_3$, YBr$_3$, and LiI were prepared at a molar ratio of LiCl:YCl$_3$:YBr$_3$:LiI=6:2:1:3. Subsequently, milling processing was performed at 600 rpm for 25 hours using a planetary ball mill (P-7 type, manufactured by Fritsch Co. Ltd.) to provide a powder of the first solid electrolyte material Li$_3$YBrCl$_4$I.

The positive electrode material of the inventive example 2 was produced in the same manner as in the inventive example 1, except for the production of the first solid electrolyte material.

Inventive Example 3

[Production of First Solid Electrolyte Material]

In an argon glove box with a dew point of −60° C. or less, raw material powders LiBr; YBr$_3$, and LiI were prepared at a molar ratio of LiBr:YBr$_3$:LiI=2:1:1. Subsequently, milling processing was performed at 600 rpm for 25 hours using a planetary ball mill (P-7 type, manufactured by Fritsch Co. Ltd.) to provide a powder of the first solid electrolyte material Li$_3$YBr$_5$I.

The positive electrode material of the inventive example 3 was produced in the same manner as in the inventive example 1, except for the production of the first solid electrolyte material.

Inventive Example 4

[Production of First Solid Electrolyte Material]

In an argon glove box with a dew point of −60° C. or less, raw material powders YBr$_3$ and LiI were prepared at a molar ratio of YBr$_3$:LiI=1:3. Subsequently, milling processing was performed at 600 rpm for 25 hours using a planetary ball mill (P-7 type, manufactured by Fritsch Co. Ltd.) to provide a powder of the first solid electrolyte material Li$_3$YBr$_3$I$_3$.

The positive electrode material of the inventive example 4 was produced in the same manner as in the inventive example 1, except for the production of the first solid electrolyte material.

Inventive Example 5

[Production of First Solid Electrolyte Material]

In an argon glove box with a dew point of −60° C. or less, raw material powders LiBr, LiI, and YI$_3$ were prepared at a molar ratio of LiBr:LiI:YI$_3$=1:2:1. Subsequently, milling processing was performed at 600 rpm for 25 hours using a planetary ball mill (manufactured by Fritsch, P-7 type) to provide a powder of the first solid electrolyte material Li$_3$YBrI$_5$.

The positive electrode material of the inventive example 5 was produced in the same manner as in the inventive example 1, except for the production of the first solid electrolyte material.

Inventive Example 6

[Production of First Solid Electrolyte Material]
In the argon glove box with a dew point of −60° C. or less, raw material powders LiCl and YCl$_3$ were prepared at a molar ratio of LiI:YI$_3$=2.7:1.1. Subsequently, milling processing was performed at 250 rpm for 15 hours using a planetary ball mill (P-5 type, manufactured by Fritsch Co. Ltd.) to provide a powder of the first solid electrolyte material Li$_{2.7}$Y$_{1.1}$Cl$_6$.

The positive electrode material of the inventive example 6 was produced in the same manner as in the inventive example 1, except for the production of the first solid electrolyte material.

Comparative Example 1

The positive electrode material of the comparative example 1 was produced in the same manner as in the inventive example 1, except that the positive electrode active material coating layer was not produced and that NCM on which no coating layer was formed was used.

Comparative Example 2

The positive electrode material of the comparative example 2 was produced in the same manner as in the inventive example 2, except that the positive electrode active material coating layer was not produced and that NCM on which no coating layer was formed was used.

Comparative Example 3

The positive electrode material of the comparative example 3 was produced in the same manner as in the inventive example 3, except that the positive electrode active material coating layer was not produced and that NCM on which no coating layer was formed was used.

Comparative Example 4

The positive electrode material of the comparative example 4 was produced in the same manner as in the inventive example 4, except that the positive electrode active material coating layer was not produced and that NCM on which no coating layer was formed was used.

Comparative Example 5

The positive electrode material of the comparative example 5 was produced in the same manner as in the inventive example 5, except that the positive electrode active material coating layer was not produced and that NCM on which no coating layer was formed was used.

Comparative Example 6

The positive electrode material of the comparative example 6 was produced in the same manner as in the inventive example 6, except that the positive electrode active material coating layer was not produced and that NCM on which no coating layer was formed was used.

[Production of Sulfide Solid Electrolyte Material]
In an argon glove box with an Ar atmosphere with a dew point of −60° C. or less, Li$_2$S and P$_2$S$_5$ were prepared at a molar ratio of Li$_2$S:P$_2$S$_5$=75:25. These were ground and mixed in a mortar. Subsequently, milling processing was performed at 510 rpm for 10 hours using a planetary ball mill (P-7 type, manufactured by Fritsch Co. Ltd.) to provide a glassy solid electrolyte. The glassy solid electrolyte was heat-treated at 270° C. for 2 hours in an inert atmosphere. As a result, Li$_2$S—P$_2$S$_5$ which was a glass-ceramic solid electrolyte was provided.

[First Production of Secondary Battery]
The following steps were performed using each of the positive electrode materials of the inventive examples 1 to 5 and the comparative examples 1 to 5 and glass-ceramic Li$_2$S—P$_2$S$_5$.

First, in an insulating outer cylinder, 80 mg of Li$_2$S—P$_2$S$_5$ and 10 mg of the positive electrode material were stacked in this order. This was pressure-molded at a pressure of 360 MPa to provide a positive electrode and a solid electrolyte layer.

Next, 20 mg of an aluminum powder was stacked on the positive electrode. This was pressure-molded at a pressure of 360 MPa to form a current collector on the positive electrode.

Next, on the surface of the solid electrolyte layer opposite to the other surface which was in contact with the positive electrode, a metal In (thickness 200 μm), a metal Li (thickness 300 μm), and a metal In (thickness 200 μm) were sequentially stacked. This was pressure-molded at a pressure of 80 MPa to provide a stacking structure consisting of the positive electrode, the solid electrolyte layer and a negative electrode.

Next, stainless steel current collectors were disposed on the upper and lower parts of the stacking structure, and current collection leads were attached to the current collectors.

Finally, an insulating ferrule was used to block and seal the inside of the insulating outer cylinder from the outside atmosphere.

In this way, the batteries of the inventive examples 1 to 5 and the comparative examples 1 to 5 were produced.

[Second Production of Secondary Battery]
The following steps were performed using each of the positive electrode materials of the inventive example 6 and the comparative example 6, and the first solid electrolyte material Li$_{2.7}$Y$_{1.1}$Cl$_6$.

First, in the insulating outer cylinder, 80 mg of Li$_{2.7}$Y$_{1.1}$Cl$_6$ and 10 mg of the positive electrode material were stacked in this order. This was pressure-molded at a pressure of 360 MPa to provide a positive electrode and a solid electrolyte layer.

Next, 20 mg of an aluminum powder was stacked on the positive electrode. This was pressure-molded at a pressure of 360 MPa to form a current collector on the positive electrode.

Next, on the surface of the solid electrolyte layer opposite to the other surface which was in contact with the positive electrode, a metal In (thickness 200 μm), a metal Li (thickness 300 μm), and a metal In (thickness 200 μm) were sequentially stacked. This was pressure-molded at a pressure of 80 MPa to provide a stacking structure consisting of the positive electrode, the solid electrolyte layer and a negative electrode.

Next, stainless steel current collectors were disposed on the upper and lower parts of the stacking structure, and current collection leads were attached to the current collectors.

Finally, an insulating ferrule was used to block and seal the inside of the insulating outer cylinder from the outside atmosphere.

In this way, the batteries of the inventive examples 6 and the comparative example 6 were produced.

[Charge/Discharge Test]

A charge/discharge test was performed under the following conditions, using each of the batteries of the inventive examples 1 to 6 and the comparative examples 1 to 6.

The battery was placed in a thermostatic chamber at 25° C.

The battery was charged at a constant current at a current value of 70 μA, which corresponded to 0.05 C rate (20 hour rate) with respect to the theoretical capacity of the battery, and the charge was terminated at a voltage of 3.7 V.

Next, the battery was discharged likewise at a current value of 70 μA, which corresponded to 0.05 C rate, and the discharge was terminated at a voltage of 1.9 V.

In this way, the initial charge/discharge efficiency (=initial discharge capacity/initial charge capacity) of each of the batteries of the inventive examples 1 to 6 and the comparative examples 1 to 6 was provided. The results are shown in the following Table 1.

TABLE 1

| | First solid electrolyte material | Presence or Absence of positive electrode active material coating layer | Second solid electrolyte material | Charge/discharge efficiency (%) |
|---|---|---|---|---|
| Inventive Example 1 | $Li_3YBr_2Cl_2I_2$ | Present | $Li_2S—P_2S_5$ | 81.5 |
| Inventive Example 2 | $Li_3YBrCl_4I$ | Present | $Li_2S—P_2S_5$ | 71.6 |
| Inventive Example 3 | $Li_3YBr_5I$ | Present | $Li_2S—P_2S_5$ | 79.1 |
| Inventive Example 4 | $Li_3YBr_3I_3$ | Present | $Li_2S—P_2S_5$ | 83.6 |
| Inventive Example 5 | $Li_3YBrI_5$ | Present | $Li_2S—P_2S_5$ | 72.4 |
| Inventive Example 6 | $Li_{2.7}Y_{1.1}Cl_6$ | Present | $Li_{2.7}Y_{1.1}Cl_6$ | 90.5 |
| Comparative Example 1 | $Li_3YBr_2Cl_2I_2$ | Absent | $Li_2S—P_2S_5$ | 52.8 |
| Comparative Example 2 | $Li_3YBrCl_4I$ | Absent | $Li_2S—P_2S_5$ | 65.9 |
| Comparative Example 3 | $Li_3YBr_5I$ | Absent | $Li_2S—P_2S_5$ | 74.0 |
| Comparative Example 4 | $Li_3YBr_3I_3$ | Absent | $Li_2S—P_2S_5$ | 81.0 |
| Comparative Example 5 | $Li_3YBrI_5$ | Absent | $Li_2S—P_2S_5$ | 5.2 |
| Comparative Example 6 | $Li_{2.7}Y_{1.1}Cl_6$ | Absent | $Li_{2.7}Y_{1.1}Cl_6$ | 89.1 |

[AC Impedance Measurement]

Using each of the batteries of the inventive example 4 and the comparative example 4, a charge-discharge test was performed under the following conditions.

The battery was placed in a thermostatic chamber at 25° C.

The battery was charged at a constant current at a current value of 70 which corresponded to 0.05 C rate (20 hour rate) with respect to the theoretical capacity of the battery, and the charge was terminated at a voltage of 3.7 V.

The AC impedance test was performed on the battery after the charge under the following conditions: "Reference voltage: Open circuit voltage", "Voltage amplitude: 10 mV", and "Frequency: 1 MHz-0.01 Hz".

Figure 3A:
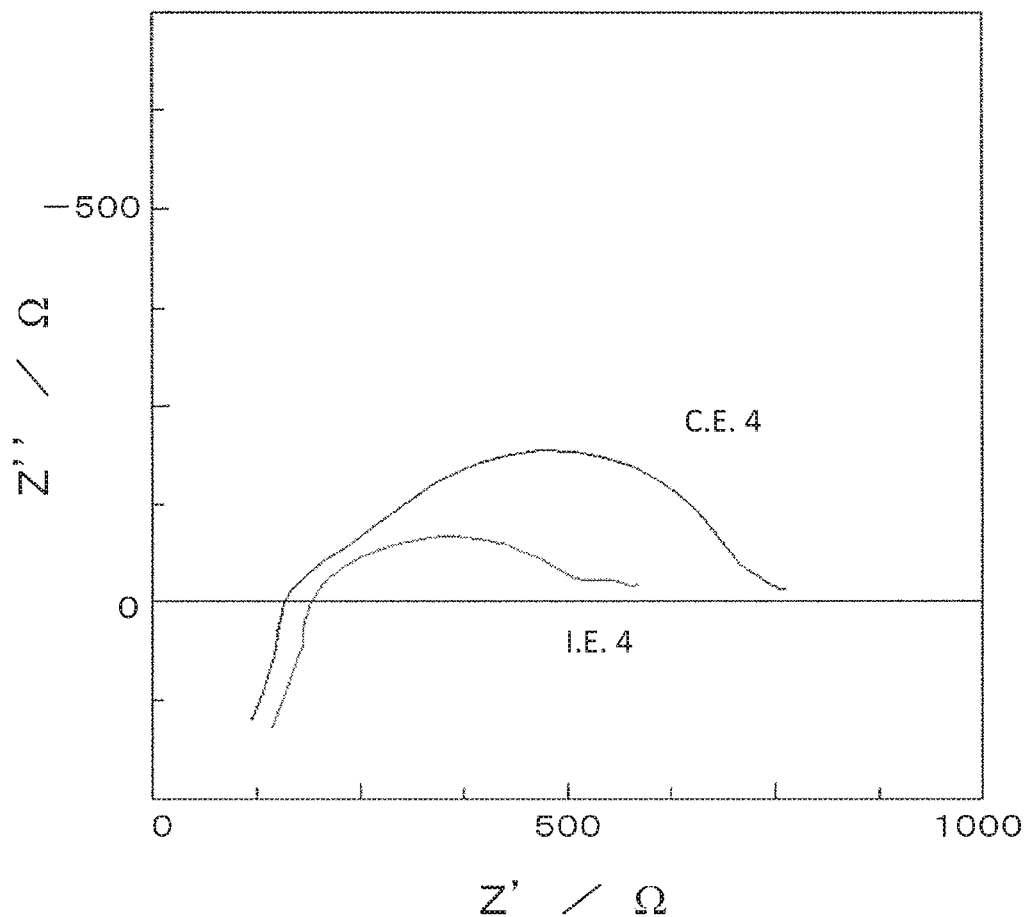
FIG. 3A is a diagram showing results of AC impedance measurements of the inventive example 4 and the comparative example 4.
Figure 3B:
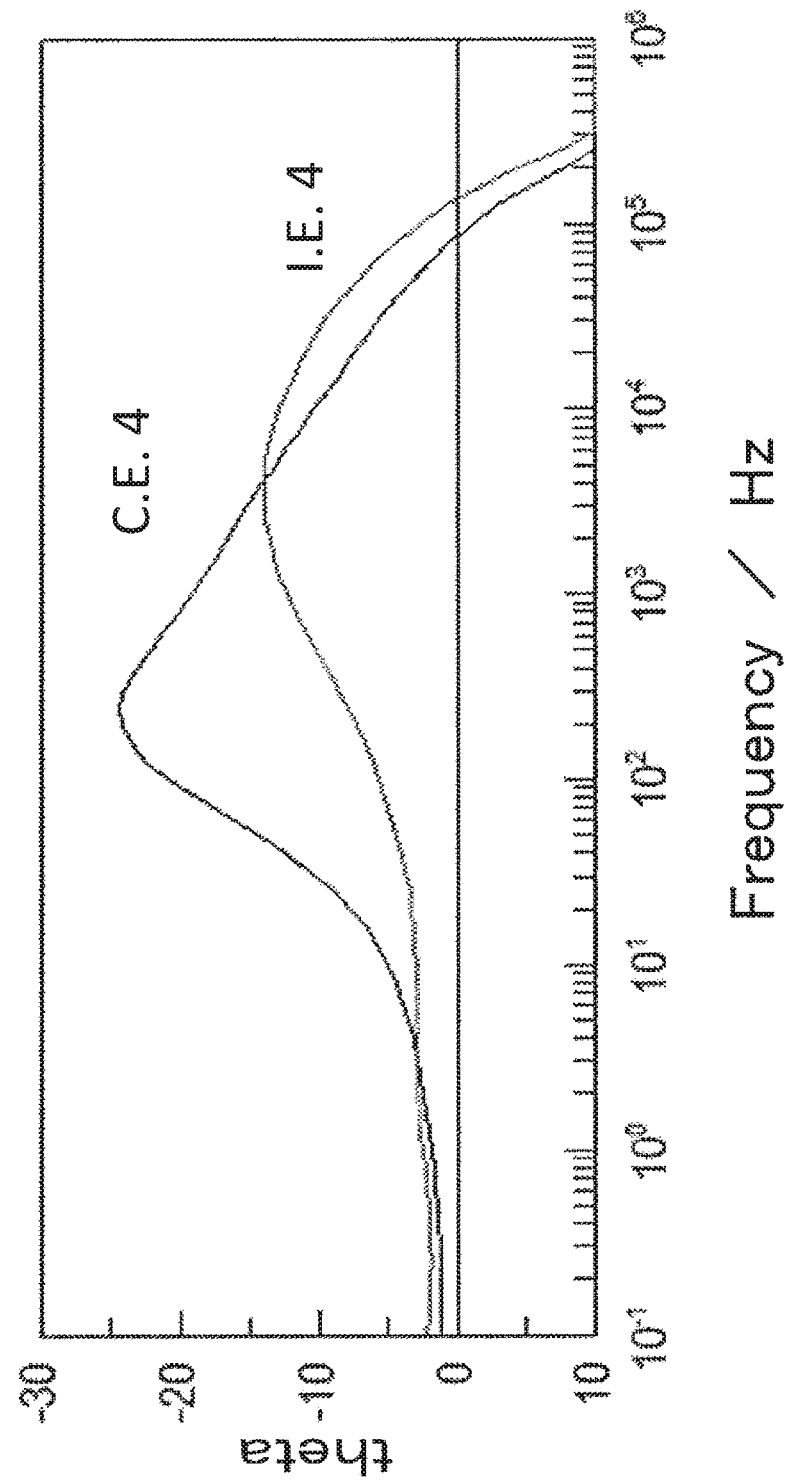
FIG. 3B is a diagram showing the results of the AC impedance measurements of the inventive example 4 and the comparative example 4.

FIGS. 3A and 3B are diagrams showing results of the AC impedance measurements of the inventive example 4 and the comparative example 4.

FIG. 3A shows a provided cole-cole plot, and FIG. 3B shows a Bode plot.

<<Discussion>>

From the results shown in Table 1, it was confirmed that the charge-discharge efficiency of the battery is improved by including a first solid electrolyte material represented by the composition formula $Li_\alpha M_\beta X_\gamma$, where α, β and γ are values larger than 0, M includes at least one of the metalloid elements and the metal elements other than Li, and X is one or more kinds of elements selected from the group consisting of Cl, Br and I, and by providing the coating layer including the coating material on the surface of the positive electrode active material.

From the cole-cole plot shown in FIG. 3A, it is confirmed that, by providing the coating layer including the coating material on the surface of the positive electrode active material, the interface resistance of the electrode reaction which appears as a semicircular arc-shaped response can be greatly lowered.

In addition, from the Bode plot shown in FIG. 3B, it is confirmed that the formation of the oxide layer of the first solid electrolyte material which appears at $10^3$-$10^1$ Hz is suppressed by providing the coating layer including the coating material on the surface of the positive electrode active material.

INDUSTRIAL APPLICABILITY

The battery of the present disclosure can be used, for example, as an all-solid lithium secondary battery.

REFERENTIAL SIGNS LIST

1000 Positive electrode material
100 First solid electrolyte particle
110 Positive electrode active material particle
111 Coating layer
2000 Battery
201 Positive electrode
202 Electrolyte layer
203 Negative electrode

The invention claimed is:

1. A positive electrode material, comprising:
   particles of a positive electrode active material;
   a coating layer surrounding a surface of the particles of the positive electrode active material, and comprising an oxide solid electrolyte; and
   particles of a first solid electrolyte material located on a surface of the particles of the coated positive electrode active material, wherein
   the first solid electrolyte material is represented by the composition formula $Li_\alpha M_\beta X_\gamma$,
   where
   $2.7 \leq \alpha \leq 3$,
   $1 \leq \beta \leq 1.1$,
   $\gamma = 6$,
   $2 \leq \gamma/\alpha \leq 2.22$,
   M is at least one kind selected from the group consisting of B, Si, Ge, As, Sb, Te, Na, K, Rb, Cs, Be, Mg, Ca, Sr, Ba, Sc, Y, La, Ce, Pr, Nd, Sm, Eu, Gd, Tb, Dy, Ho, Er, Tm, Yb, Lu, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, Tl, Sn, Pb, and Bi, and X is at least one kind selected from the group consisting of Cl, Br, and I.

2. The positive electrode material according to claim 1, wherein

M includes yttrium (Y) in the formula $Li_\alpha M_\beta X_\gamma$.

3. The positive electrode material according to claim 1, wherein

X includes iodine (I) in the formula $Li_\alpha M_\beta X_\gamma$.

4. The positive electrode material according to claim 1, wherein the coating layer comprising the oxide solid electrolyte comprises lithium niobate.

5. The positive electrode material according to claim 1, wherein the positive electrode active material is lithium nickel-cobalt-manganese oxide.

6. A battery comprising:

a positive electrode including the positive electrode material according to claim 1;

a negative electrode; and an electrolyte layer disposed between the positive electrode and the negative electrode, wherein the electrolyte layer includes a sulfide solid electrolyte.

7. The battery according to claim 6, wherein the sulfide solid electrolyte is one of $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$.

\* \* \* \* \*